Patented Apr. 1, 1930

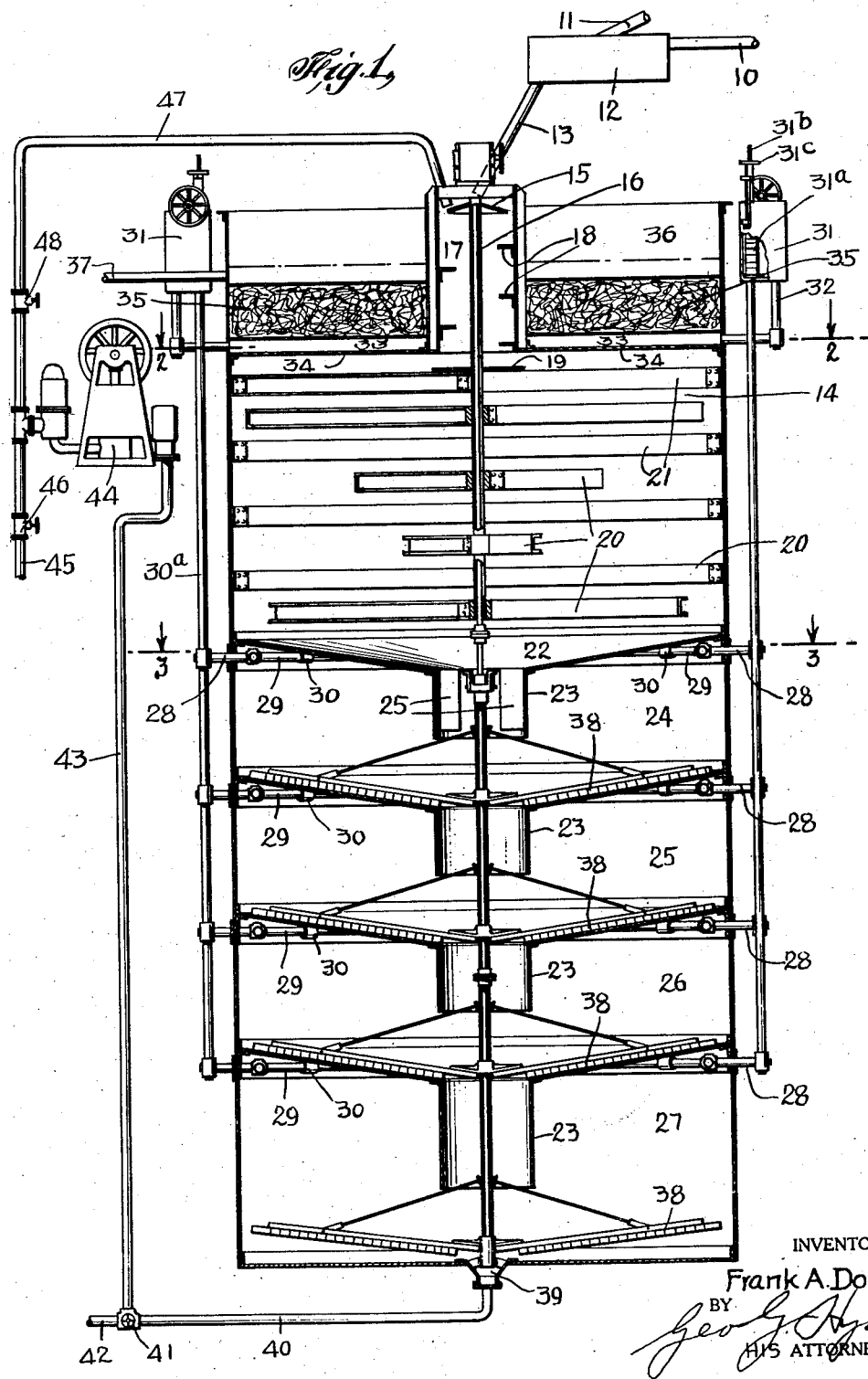

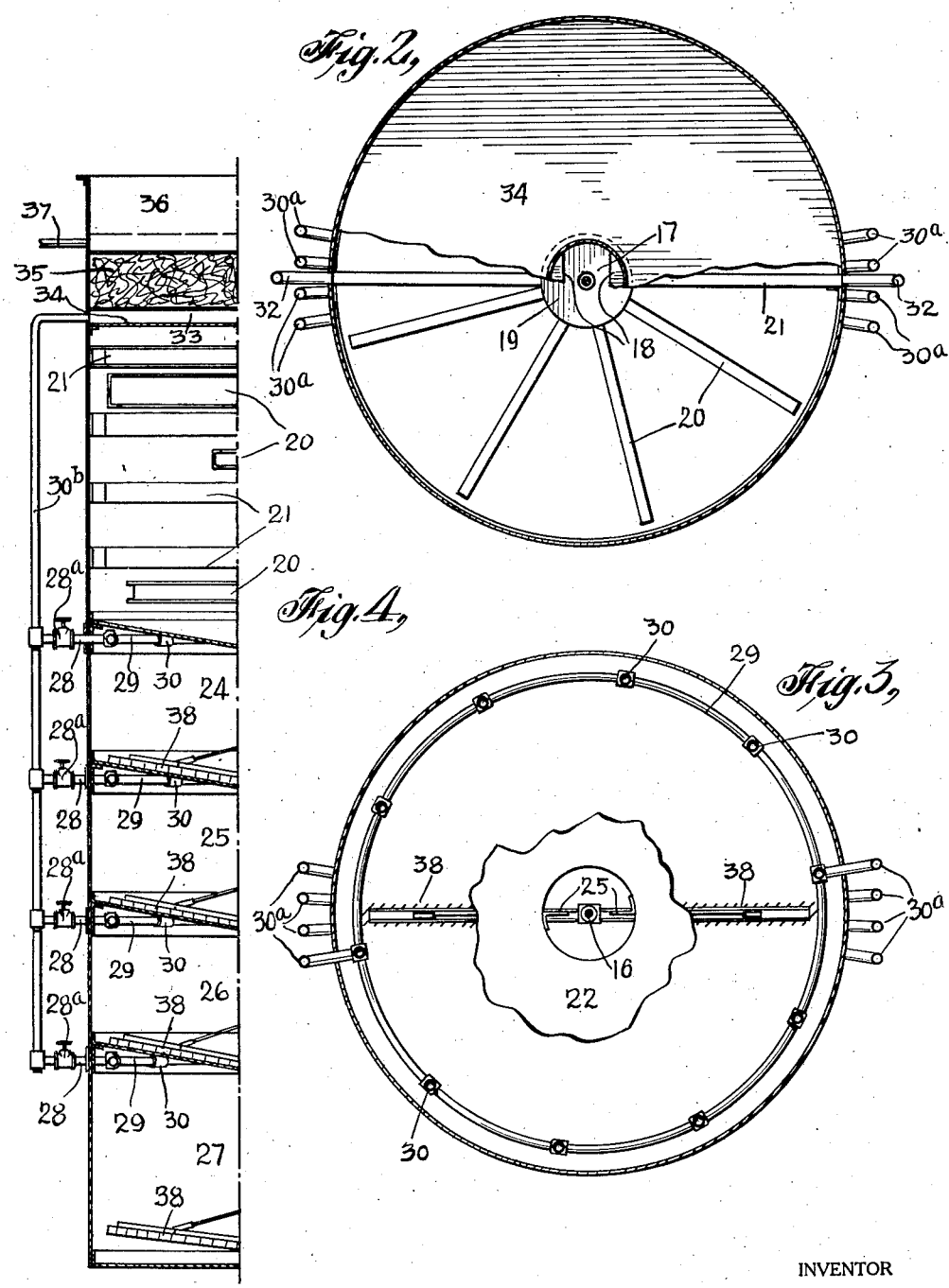

1,752,789

UNITED STATES PATENT OFFICE

FRANK A. DOWNES, OF NEW YORK, N. Y., ASSIGNOR TO THE DORR COMPANY, OF NEW YORK, N. Y., A CORPORATION OF DELAWARE

AGITATION AND SETTLING APPARATUS

Application filed August 7, 1925. Serial No. 48,731.

This invention relates generally to the treatment of liquids and suspended solids by flocculation and sedimentation, and is particularly directed to apparatus for the purpose provided with an agitation compartment followed by a sedimentation unit.

The apparatus is adapted for use in processes where a liquid is subjected to treatment by suitable reagents which produce a precipitate, or tend to assist in the sedimentation or flocculation of suspended solids, or in some instances may accomplish both objects. It has been the practice to provide mixing chambers to assure the thorough mixture of the liquid and reagent; but the settling periods for the resulting suspension of solids have varied considerably, and have generally fallen substantially short of the maximum attainable rate of settling.

This invention has as a general object an improvement in the means for carrying out the preliminary treatment of the liquid with the desired reagents and the removal of the suspended solids by sedimentation which is adapted to operate continuously and to accomplish the maximum removal of solids in the minimum of time and space. The type of machine illustrated is particularly suitable in industrial water softening, where the volume of liquid handled is very large in comparison with the amount of solids precipitated, and furthermore the solids are so light that thorough removal by sedimentation without disturbance of the flow of liquid in a reasonably compact apparatus presents numerous obstacles.

An arrangement has been developed in which the chemicals are not only thoroughly mixed with the water, where the machine is used for industrial water softening, but the mixture is also subjected to a further period of carefully controlled agitation adapted to assure maximum flocculation without destruction of the flocs. The sedimentation operation is carried on in a series of compartments preferably arranged so that all the solids are carried to a single outlet, while the softened water is withdrawn in such a way as not to interfere with the relatively light solids.

Other features of the invention will be apparent from the following description taken in connection with the accompanying drawings, in which Fig. 1 is a vertical central section through one form of apparatus.

Fig. 2 is a horizontal section on line 2—2 of Fig. 1 looking downward,

Fig. 3 is a similar view on line 3—3 of Fig. 1 and

Fig. 4 is a fragmentary vertical section similar to Fig. 1 showing a modified form of overflow arrangement.

The initial mixing of the reagents with the liquid may be carried out in any desired manner, as by the use of the usual chemical feeders. This is shown diagrammatically in the drawings, in which the liquid inlet 10 and reagent discharge 11 pass into the mixing apparatus 12, which discharges through conduit 13 into the agitation compartment 14 of the machine. In the form illustrated the conduit 13 discharges directly onto a suitable surface over which it is spread in a thin layer, permitting the air or gases which might be entrapped to escape. This deaeration element may conveniently comprise a disc 15 mounted on quill shaft 16 and preferably sloping downwardly to assure even flow, with sufficient clearance at the edges to permit unobstructed flow of the feed into the feed well 17 which communicates with agitation chamber 14. Suitable transverse baffles 18 may be located in the feed well to produce a certain amount of agitation of the liquid in the well and thereby assist in mixing. A suitable distributor plate 19 may also be located immediately below the discharge end of the well to assure lateral distribution of the feed.

Suitable means are employed in chamber 14 for insuring the thorough intermixing of the reagents with the liquid, a favorable rate of mechanical agitation, and an adequate detention period. For this purpose I have found that in certain industries, particularly in water softening plants, a paddle type agitator run at a moderate speed is suitable. This may comprise a plurality of radial paddles 20 revolved in any preferred manner, as by mounting them on quill shaft 16. For efficient mixing I may also employ a vertical series of fixed radial baffles 21 to prevent swirl and consequent inefficient mixing. The distributor plate 19 may conveniently be mounted on the uppermost baffle 21.

In order to avoid undue resistance and excessive local agitation which would result if all the rotating paddles simultaneously passed the fixed baffles, a staggered relationship between paddles and baffles is desirable. This can conveniently be accomplished by arranging the baffles in vertical alignment and staggering the paddles around shaft 16 as shown in the drawings.

Under certain conditions it may be desirable to subject the liquid and reagents to a relatively violent initial agitation followed by less violent agitation as the intermixture or reaction approaches completion and flocs of substantial size begin to form. This can be accomplished in various ways, as by varying the width of paddles 20, the clearance between said paddles and baffles 21, or both. In Figure 4 of the drawings it will be noted that the topmost paddle 20 is wider than the other paddles, and there is less clearance between said paddle and the adjacent baffles 21.

The thoroughly mixed and flocculated material is discharged from the bottom of the agitation compartment 14 directly into sedimentation apparatus, which preferably comprises a suitable series of settling compartments forming a tray clarifier. In the form illustrated the bottom 22 of the agitation compartment has a central discharge opening which is of sufficient size to prevent a velocity of flow which would tend to break down the flocs. A downward discharge spout or boot 23 is preferably connected to the opening so that the feed to the settling compartment 24 enters a substantial distance below the top thereof. Suitable vertical baffle plates 25 may be employed to prevent swirl in the boot, since the lowermost paddle 20 is preferably located sufficiently close to the agitator compartment bottom 22 to prevent the permanent accumulation thereon of any solids.

Either one or any additional number of settling compartments may be employed. In the drawings four such compartments 24, 25, 26 and 27 are shown, each containing a suitable overflow for decanting the liquid and preferably mechanical means for propelling the settled solids to a discharge. In the form illustrated the decantation system for each settling compartment comprises an overflow pipe 28 extending into the compartment and provided with a suitable inlet adjacent the top of the compartment through which the liquid enters the pipe. For efficiency in insuring an even radial flow of the liquid from the feed inlet of the compartment to the overflow to avoid local currents between feed and overflow where large flows are handled, a condition which decreases efficiency and may disturb seriously the solids near the tray bottom where such solids are relatively light or fine, the inlet to the pipe should communicate with the compartment substantially throughout the periphery of the upper part of the compartment. This is conveniently accomplished by employing a suitable conduit such as pipe 29 running around the upper outer margin and having openings 30 close to the compartment top. The uniform overflow is further assisted by the use of two or more outlet pipes 28, the arrangement shown having one on each side of the tank. Each outlet pipe 28 is connected by means of a suitable riser 30$^a$ with the overflow box 31 in which the elevation of the top of each riser may be varied to control the rate of liquid discharge from each compartment, and thereby the rate of feed to each compartment.

In certain industries, particularly in industrial water softening, it is desirable to subject the product to a final filtration to remove extremely fine particles requiring an excessive settling period, and a storage reservoir is also frequently necessary, especially where the machine is adapted to run continuously or semi-continuously while the withdrawal may be intermittent. One arrangement suitable for this purpose is illustrated. The discharge pipe 32 from each overflow box 31 communicates with compartment 33 directly above the top 34 of the agitation compartment. The liquid passes thence upwardly through a filter 35 of any desired type, excelsior filters being standard in railroad water softening, and accumulates above the filter in storage compartment 36. A suitable discharge pipe 37 is connected to the storage space 36; and the filter 35 can be cleaned when necessary in the well known way by opening a suitable flushing outlet connected to compartment 33, the liquid in storage compartment 36 serving as a flushing backwash.

If desired another method of controlling the overflow from the various sedimentation compartments, and for carrying the overflow to the desired point, may be employed. This is shown in Fig. 4, in which the various overflow pipes 28 at one side of the machine are connected each through a valve 28$^a$ to a common riser 30$^b$, which in the form illustrated discharges into the space 33.

The solids which settle on the bottom of each of the sedimentation compartments 24, 25, 26 and 27 are carried to a central discharge opening by rotating inclined rakes or scrapers 38, in well known manner. Various methods for withdrawing the solids are known, but for convenience the arrangement shown is preferred, comprising the use of a series of registered central openings in the settling compartments through which solids pass, the lowermost compartment 27 having a central bottom discharge opening 39. Each of the upper discharge openings is preferably surrounded by a suitable downward collar or boot 23 to assist the downward passage of the solids.

The apparatus is arranged so that the sludge may be withdrawn continuously, or its withdrawal may be interrupted for such periods as may be necessary, the lowermost compartment 27 serving in part as a sludge storage space if necessary. The sludge may be discharged either through pipe 40 by opening a suitable three way valve 41 to direct the flow from pipe 40 into the spigot discharge 42, or valve 41 may be turned to direct the sludge into the riser 43 connecting with a suitable pump 44 which should be of the constant volume displacement type. Diaphragm pumps, particularly pressure pumps, are suitable for the purpose.

The discharge from pump 44 may be carried off thru pipe 45 when valve 46 is open, or may be returned in part or entirely to the feed, since it has been determined that such sludge has a decidedly beneficial effect upon the rate and size of floc formation. Furthermore, such return tends to prevent waste of chemicals due to inadequate combination of the chemicals with the liquid or ingredients thereof. The relative proportion of sludge returned in this manner through pipe 47, which discharges into the feed well 17, may be controlled by suitably manipulating valve 48 in combination with valve 46.

It is recognized that machines have heretofore been proposed in which the removal of solids is accomplished by agitation, followed by settling; but the arrangement shown is particularly simple, efficient and convenient to construct, since preferably the agitation and settling compartments are formed in a single cylindrical tank which is readily obtainable from numerous manufacturers. Moreover the entire system of agitation and settling, combined if desired with filtration and storage, is very compact and more convenient than the multiplicity of tanks often used. There are further advantages in the compactness attained by the use of the highly efficient multiple compartment settling arrangement in direct connection with the agitation compartment. It will further be apparent that the machine, which is adapted to operate continuously will therefore require a minimum of attention.

It will of course be recognized that various modifications of the construction may be made within the scope of the claims.

I claim—

1. Flocculation and sedimentation apparatus comprising a sedimentation compartment, rotary means therein for mechanically impelling settled solids to a point of discharge and a superposed agitation chamber discharging into said compartment.

2. Flocculation and sedimentation apparatus comprising a sedimentation compartment, rotary means therein for mechanically impelling settled solids to a point of discharge, a superposed agitation chamber discharging into said compartment, and rotary agitation mechanism in said chamber.

3. Flocculation and sedimentation apparatus comprising a sedimentation compartment, rotary means therein for mechanically impelling settled solids to a point of discharge, a superposed agitation chamber discharging into said compartment, and rotary agitation mechanism in said chamber coaxial with the mechanical impelling means.

4. Flocculation and sedimentation apparatus comprising a plurality of superposed sedimentation compartments in direct communication, rotary agitation mechanism in an upper compartment, and rotary mechanism in each compartment thereunder for impelling solids to a point of discharge.

5. Flocculation and sedimentation apparatus comprising a sedimentation compartment, rotary means therein for mechanically impelling settled solids to a point of discharge, a superposed agitation chamber discharging into said compartment, a shaft for the impelling means extending upwardly through the chamber, a rotary mechanical agitator in said chamber, and a hollow drive shaft for the agitator extending around the shaft which actuates the impelling means.

6. Flocculation and sedimentation apparatus comprising a plurality of superposed sedimentation compartments, rotary means in each compartment for impelling settled solids to a discharge, a common drive shaft therefor extending upwardly, a superposed agitation chamber surrounding the shaft located above the uppermost sedimentation compartment and discharging thereinto, a rotary mechanical agitator in said chamber and a driving element for the agitator surrounding said shaft.

7. Flocculation and sedimentation apparatus comprising a storage compartment, an agitation chamber located immediately below said compartment, a feed well passing downwardly through said compartment into the chamber, and a sedimentation compartment subjacent to the agitation chamber into which the latter discharges.

8. Flocculation and sedimentation apparatus comprising a storage compartment, a subjacent agitation chamber, a feed well passing downwardly through said compartment into the chamber, mechanical agitation means in said chamber, mechanical means in the sedimentation compartment for sweeping settled solids to a discharge, and drive mechanism for said agitation and sweeping means extending downwardly through the well.

9. Flocculation and sedimentation apparatus comprising a sedimentation compartment, an agitation chamber discharging into said compartment, means for mechanically impelling the solids settling in the chamber to a point of discharge, and means for returning settled solids to the agitation chamber.

10. Flocculation and sedimentation apparatus comprising a sedimentation compartment, rotary means therein for mechanically impelling settled solids continuously to a point of discharge, an agitation chamber discharging into said compartment and means for continuously returning settled solids to the agitation chamber.

11. Flocculation and sedimentation apparatus comprising a sedimentation compartment, rotary means therein for mechanically impelling settled solids to a point of discharge, an agitation chamber discharging into said compartment, and means including a constant volume displacement pump for returning settled solids to the agitation chamber.

12. Flocculation and sedimentation apparatus comprising a plurality of superposed sedimentation compartments, an agitation chamber located immediately above the uppermost compartment, a discharge passage extending from said chamber and communicating with each of the compartments, an overflow passage from the upper part of each compartment, and means for controlling the proportionate feed to said compartments by controlling the relative resistance of said overflows.

13. Flocculation and sedimentation apparatus comprising a sedimentation compartment, rotary means therein for mechanically impelling settled solids to a discharge, a superposed agitation chamber discharging centrally into said compartment, and means for withdrawing the supernatant liquid from said compartment at a plurality of spaced points in the upper part thereof.

14. Flocculation and sedimentation apparatus comprising a plurality of superposed sedimentation compartments, each having a central feed opening, an agitation chamber having a discharge passage communicating with the feed openings of said compartments, mechanical means for impelling settled solids to a discharge and means for withdrawing the supernatant liquid from each compartment at a plurality of spaced points along the outer zone thereof.

15. Flocculation and sedimentation apparatus comprising a plurality of transverse partitions forming a plurality of sedimentation compartments therein each partition having a substantially central opening, an agitation chamber discharging through the uppermost opening, and a downcast annular boot extending from each partition downwardly about said opening to a point spaced from the bottom of the compartment, the construction being such that feed passing downwardly through the opening is introduced into the lower part of the subjacent compartment.

16. Flocculation and sedimentation apparatus comprising a sedimentation compartment, rotary means therein for mechanically impelling settled solids to a point of discharge, and a superposed agitation chamber discharging into said compartment through a suitably enlarged outlet passage, the size of the passage being so proportioned with relation to the rate of flow and the characteristics of the material treated that the rate of flow through the passage is less than the rate at which flocs are broken up.

17. Flocculation and sedimentation apparatus comprising means for subjecting a fluid and flocculant to initial relatively violent agitation and thereafter to less violent agitation; a sedimentation compartment into which the mixture resulting from such agitation is directly discharged, and mechanical means in said compartment for impelling settled solids to a point of discharge.

FRANK A. DOWNES.